United States Patent [19]
Garwood et al.

[11] 4,149,960
[45] Apr. 17, 1979

[54] GAS OIL PROCESSING

[75] Inventors: William E. Garwood, Haddonfield; Philip D. Caesar, Princeton; James A. Brennan, Cherry Hill, all of N.J.

[73] Assignee: Mobil Oil Corporation, New York, N.Y.

[21] Appl. No.: 889,483

[22] Filed: Mar. 23, 1978

Related U.S. Application Data

[63] Continuation of Ser. No. 752,696, Dec. 20, 1976, abandoned.

[51] Int. Cl.² .................... C10G 13/04; C10G 11/04; B01J 29/28
[52] U.S. Cl. .................................... 208/111; 208/120
[58] Field of Search ................................ 208/120, 111

[56] References Cited
U.S. PATENT DOCUMENTS 3,699,036  10/1972  Hass et al. ........................ 208/111
3,852,189  12/1974  Chen et al. ....................... 208/120
3,894,102  7/1975   Chang et al. ..................... 260/668 R
3,968,024  7/1976   Gorring et al. ................... 208/111

Primary Examiner—Delbert E. Gantz
Assistant Examiner—George Schmitkons
Attorney, Agent, or Firm—Charles A. Huggett; Michael G. Gilman; Charles J. Speciale

[57] ABSTRACT

An improved processing technique is provided for gas oil pour point reduction and dewaxing. The improved technique comprises contacting an appropriate gas oil feedstock with a catalyst comprising a crystalline aluminosilicate zeolite characterized by a silica/alumina mole ratio of at least 12 and a constraint index, hereinafter defined, within the approximate range of 1 to 12 in the presence of a relatively large amount of co-fed water. The amount of co-fed water is maintained at from about 0.5 to about 15 moles of water/mole of gas oil feedstock.

24 Claims, No Drawings

GAS OIL PROCESSING

CROSS REFERENCE TO RELATED APPLICATION

This is a continuation of application Ser. No. 752,696 filed Dec. 20, 1976, and now abandoned.

BACKGROUND OF THE INVENTION

1. Field of the Invention

This invention relates to a process for dewaxing petroleum oils and fractions thereof by selectively removing normal paraffinic and other undesirable hydrocarbons from petroleum oils in which they are present in admixture with other hydrocarbons, in order to lower the pour point of such oils. More particularly, the invention relates to an improved single-step process for selectivity removing normal paraffinic and other undesirable hydrocarbons from petroleum oils by contacting same with a specific zeolite catalyst in the presence of a large amount of co-fed water.

2. Description of the Prior Art

It is well known in the art to form various lubricating oils from hydrocarbon fractions derived from petroleum crudes. A heretofore practiced common procedure known in the art is to extract these hydrocarbon fractions with various solvents so as to give a raffinate of a desired high viscosity index, such material being resistant to changes in viscosity with changes in temperature and thus being useful under varying operating conditions. Moreover, it is particularly desired that the lube oil have a low pour point so that it can be effectively used at low temperature conditions, since excessive thickening at low temperature is often unacceptable. It is also known in the art to carry out dewaxing operations by contacting hydrocarbon fractions with crystalline aluminosilicate zeolites having pore sizes of about 5 Angstrom units so as to selectively remove normal paraffins.

The present invention is concerned with an improved process for dewaxing normal paraffin-containing oils which is more economical than conventional solvent dewaxing procedures or catalytic dewaxing procedures involving 5 Angstrom unit zeolites and which, with certain feedstocks, produces a higher product yield with equivalent or higher pour point reduction and prolonged catalyst cycle time between regenerations.

Trace amounts of water used to promote various catalytic reactions, not including gas oil dewaxing, is known in the art. For example, U.S. Pat. No. 3,546,100 teaches restricting the partial pressure of water in contact with a hydrocracking catalyst during hydrocracking of a hydrocarbon compound to within the range of 10 to 130 mm. U.S. Pat. No. 3,649,524 teaches a high temperature reforming process using only 8–20 ppm water.

Somewhat larger amounts of water have been used in high temperature catalytic dehydrogenation of hydrocarbons (U.S. Pat. No. 3,907,921), wherein 25–3000 ppm of water is used; and in hydrodesulfurization of gas oils and cycle oils (U.S. Pat. No. 3,720,602) wherein 5 to 50 percent of water is injected. In the latter patent, the catalyst material used does not include zeolite materials.

The use of large amounts of water, i.e. about 0.5 to about 15 moles water/mole hydrocarbon feedstock, would be expected, based upon the teaching of the art, to destroy conventional porous, siliceous heterogeneous catalysts, such as used in the present method.

U.S. Pat. No. 3,755,138 discloses a two-step process for dewaxing hydrocarbon oil feedstocks boiling above about 650° F. having an intermediate pour point. One step of the patent process comprises solvent dewaxing and the other step comprises contact with a ZSM-5 type of zeolite in the absence of co-fed water. U.S. Pat. No. Re. 28,398 discloses dewaxing a hydrocarbon oil boiling above 350° F. by shape selective cracking and hydrocracking over a zeolite of ZSM-5 type without co-fed water.

SUMMARY OF THE INVENTION

This invention relates to improved processing of gas oils wherein said processing comprises contacting a gas oil feedstock in the presence of from about 0.5 to about 15 moles of co-fed water/mole of gas oil feedstock with a catalyst comprising a crystalline aluminosilicate zeolite characterized by a silica/alumina mole ratio of at least 12 and a constraint index, hereinafter defined, within the approximate range of 1 to 12.

The feedstock adapted for treatment in accordance with the present invention may be generally defined as hydrocarbon oils boiling above about 350° F. and particularly between about 350° F. and about 1,100° F. Processing of such feedstocks having a high nitrogen content of from about 0.01 to about 3 wt. percent is most advantageously benefited by the present improved processing technique.

The crystalline aluminosilicate zeolites used in the catalyst composition of the process of this invention are referred to generally as ZSM-5 type or as behaving like ZSM-5 and include ZSM-5, ZSM-11, ZSM-12, ZSM-35 and ZSM-38, more particularly described hereinafter.

DESCRIPTION OF SPECIFIC EMBODIMENTS

The catalyst composition useful in this invention comprises a crystalline aluminosilicate zeolite characterized by a silica/alumina mole ratio of at least 12 and a constraint index of from about 1 to about 12, non-limiting examples of which include ZSM-5, ZSM-11, ZSM-12, ZSM-35 and ZSM-38.

Zeolite ZSM-5 is taught by U.S. Pat. No. 3,702,886, issued November 14, 1972, the disclosure of which is incorporated herein by reference. In a preferred synthesized form, the zeolite ZSM-5 for use in the catalyst composition useful in this invention has a formula, in terms of mole ratios of oxides in anhydrous state, as follows:

wherein M is selected from the group consisting of a mixture of alkali metal cations, especially sodium, and tetraalkylammonium cations, the alkyl groups of which preferably contain 2 to 5 carbon atoms, and x is at least 5. Particularly preferred is a zeolite having the formula in the anydrous state as follows:

wherein Z is from greater than 30 to about 350 or higher.

Zeolite ZSM-11 is taught by U.S. Pat. No. 3,709,979, issued Jan. 9, 1973, the disclosure of which is incorporated herein by reference. In the as synthesized form, the zeolite ZSM-11 for use in the catalyst composition useful in this invention has a formula, in terms of mole ratios of oxides in the anhydrous state, as follows:

$$(0.9 \pm 0.3)M_{2/n}O:Al_2O_3:20 \text{ to } 90 \text{ }SiO_2$$

wherein M is a mixture of at least one of the quaternary cations of a Group V-A element of the Periodic Table and alkali metal cations, especially sodium. The original cations can be present so that the amount of quaternary metal cations is between 10 and 90 percent of the total amount of the original cations. Thus, the zeolite can be expressed by the following formula in terms of mole ratios of oxides:

$$(0.9 \pm 0.3)(xXR_4 + 1 - xM_{2/n}O):Al_2O_3:20 \text{ to } 90 \text{ }SiO_2$$

wherein R is an alkyl or aryl group having between 1 and 7 carbon atoms, M is an alkali metal cation, X is a group V-A element, especially a metal, and x is between 0.1 and 0.9.

Zeolite ZSM-12 is taught by U.S. Pat. No. 3,832,449, issued Aug. 27, 1974, the disclosure of which is incorporated hereby by reference.

ZSM-35 is described in U.S. application Ser. No. 528,061, filed Nov. 29, 1974 (now U.S. Pat. No. 4,016,245). This zeolite can be identified, in terms of mole ratios of oxides and in the anhydrous state, as follows:

$$(0.3-2.5)R_2O:(0-0.8)M_2O:Al_2O_3:xSiO_2$$

wherein R is an organic nitrogen-containing cation derived from ethylenediamine or pyrrolidine, M is an alkali metal cation and x is greater than 8, and is characterized by a specified X-ray powder diffraction pattern.

In a preferred synthesized form, zeolite ZSM-35 has a formula, in terms of mole ratios of oxides and in the anhydrous state, as follows:

$$(0.4-2.5)R_2O:(0-0.6)M_2O:Al_2O_3:ySiO_2$$

wherein R is an organic nitrogen-containing cation derived from ethylenediamine or pyrrolidine, M is an alkali metal, especially sodium, and y is from greater than 8 to about 50.

ZSM-38 is described in U.S. application Ser. No. 560,412, filed Mar. 20, 1975 (now U.S. Pat. No. 4,046,859). This zeolite can be identified, in terms of mole ratios of oxides and in the anhydrous state, as follows:

$$(0.3-2.5)R_2O:(0-0.8)M_2O:Al_2O_3:xSiO_2$$

wherein R is an organic nitrogen-containing cation derived from a 2-(hydroxyalkyl) trialkylammonium compound, x is greater than 8 and M is an alkali metal cation, and is characterized by a specified X-ray powder diffraction pattern.

In a preferred synthesized form, the zeolite has a formula, in terms of mole ratios of oxides and in the anhydrous state, as follows:

$$(0.4-2.5)R_2O:(0-0.6)M_2O:Al_2O_3:ySiO_2$$

wherein R is an organic nitrogen-containing cation derived from a 2-(hydroxyalkyl) trialkylammonium compound, wherein alkyl is methyl, ethyl or a combination thereof, M is an alkali metal, especially sodium, and y is from greater than 8 to about 50.

Although the zeolites herein described have unusually low alumina contents, i.e. high silica to alumina ratios, they are very active even when the silica to alumina ratio exceeds 30. The activity is surprising since catalytic activity is generally attributed to framework aluminum atoms and cations associated with these aluminum atoms. These catalysts retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity. In many environments the zeolites of this class exhibit very low coke forming capability, conducive to very long times on stream between burning regenerations.

An important characteristic of the crystal structure of the zeolites for use herein is that they provide constrained access to, and egress from, the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type catalysts useful in this invention possess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels. Although catalysts with a silica to alumina ratio of at least 12 are useful, it is preferred to use catalysts having higher ratios of at least about 30. Such catalysts, after activation, acquire an intracrystalline sorption capacity for normal hexane which is greater than that for water, i.e. they exhibit "hydrophobic" properties. It is believed that this hydrophobic character is advantageous in the present invention.

The type zeolites useful in this invention freely sorb normal hexane and have a pore dimension greater than about 5 Angstroms, or, if elliptical in pore shape, at least the size of the pores in ZSM-5. In addition, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section then normal hexane is excluded and the zeolite is not of the desired type. Windows of 10-membered rings are preferred, although, in some instances, excessive puckering or pore blockage may render these catalysts ineffective. Twelve-membered rings do not generally appear to offer sufficient constraint to produce the advantageous conversions. Also, structures can be conceived due to pore blockage or other cause, that may be operative.

Rather than attempt to judge from crystal structure whether or not a catalyst possesses the necessary constrained access, a simple determination of the "constraint index" may be made by passing continuously a mixture of an equal weight of normal hexane and 3-methylpentane over a small sample, approximately 1 gram or less, of catalyst at atmospheric pressure according to the following procedure. A sample of the catalyst, in the form of pellets or extrudate, is crushed to a particle size about that of coarse sand and mounted in a glass tube. Prior to testing, the catalyst is treated with a stream of air at 1000° F. for at least 15 minutes. The catalyst is then flushed with helium and the temperature adjusted between 550° F. and 950° F. to give an overall conversion between 10% and 60%. The mixture of hydrocarbons is passed at 1 liquid hourly space velocity (i.e., 1 volume of liquid hydrocarbon per volume of catalyst per hour) over the catalyst with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Catalysts suitable for the present invention are those having a constraint index in the approximate range of 1 to 12. Constraint Index (CI) values for some typical catalysts, including those useful herein, are:

| Crystalline Aluminosilicate | CI |
|---|---|
| ZSM-5 | 8.3 |
| ZSM-11 | 8.7 |
| ZSM-12 | 2 |
| ZSM-35 | 2 |
| ZSM-38 | 2 |
| Beta | 0.6 |
| ZSM-4 | 0.5 |
| H-Zeolon | 0.5 |
| REY | 0.4 |
| Erionite | 38 |

It is to be realized that the above constraint index values typically characterize the specified zeolites but that such are the cumulative result of several variables used in determination and calculation thereof. Thus, for a given zeolite depending on the temperature employed within the aforenoted range of 550° F. to 950° F., with accompanying conversion between 10% and 60%, the constraint index may vary within the indicated approximate range of 1 to 12. Likewise, other variables such as the crystal size of the zeolite, the presence of possibly occluded contaminants and binders intimately combined with the zeolite may affect the constraint index. It will accordingly be understood by those skilled in the art that the constraint index, as utilized herein, while affording a highly useful means for characterizing the zeolites of interest is approximate, taking into consideration the manner of its determination, with the probability, in some instances, of compounding variable extremes. However, in all instances, at a temperature within the above-specified range of 550° F. to 950° F., the constraint index will have a value for any given zeolite of interest herein within the approximate range of 1 to 12.

The specific zeolites described, when prepared in the presence of organic cations, are catalytically inactive, possibly because the intracrystalline free space is occupied by organic cations from the forming solution. They may be activated by heating, for example, in an inert atmosphere at 1000° F. for one hour, followed by base exchange with ammonium salts and by calcination at 1000° F. in air. The presence of organic cations in the forming solution may not be absolutely essential to the formation of this type zeolite; however, the presence of these cations does appear to favor the formation of this special type of zeolite. More generally, it is desirable to activate this type catalyst by base exchange with ammonium salts followed by calcination in air at about 1000° F. for from about 15 minutes to about 24 hours. Before calcination, the ammonium cations may be replaced, at least in part, by ion exchange with zinc, nickel, potassium, rare earth metals and the like by contact with salts thereof in accordance with techniques well known in the art.

Natural zeolites may sometimes by converted to this type zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite and clinoptilolite. The preferred crystalline aluminosilicates are ZSM-5, ZSM-11, ZSM-12, ZSM-35 and ZSM-38, with ZSM-5 particularly preferred.

In a preferred aspect of this invention, the catalysts hereof are selected as those having a crystal framework density, in the dry hydrogen form, of not substantially below about 1.6 grams per cubic centimeter. It has been found that zeolites which satisfy all three of these criteria are most desired for the present process. Therefore, the preferred catalysts of this invention are those having a constraint index as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meir. This paper, the entire contents of which are incorporated herein by reference, is included in "Proceedings of the Conference on Molecular Sieves, London, April 1967," published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolite is associated with its high crystal anionic framework density of not less than about 1.6 grams per cubic centimeter. This high density of course must be associated with a relatively small amount of free space within the crystal, which might be expected to result in more stable structures. This free space, however, is important as the locus of catalytic activity.

Crystal framework densities of some typical zeolites are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| Dachiardite | .32 | 1.72 |
| L | .32 | 1.61 |
| Clinoptilolite | .34 | 1.71 |
| Laumontite | .34 | 1.77 |

-continued

| Zeolite | Void Volume | Framework Density |
|---|---|---|
| ZSM-4 | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

Members of the above group of zeolites for use in the catalyst composition of the present invention possess definite distinguishing crystalline structures as evidenced by the above U.S. patents incorporated herein by reference.

The synthetic ZSM-35 zeolite possessess a definite distinguishing crystalline structure whose X-ray diffraction pattern shows substantially the significant lines set forth in Table 1.

TABLE 1

| Interplanar Spacing | Relative Intensity |
|---|---|
| 9.6 ± 0.20 | Very Strong-Very, Very Strong |
| 7.10 ± 0.15 | Medium |
| 6.98 ± 0.14 | Medium |
| 6.64 ± 0.14 | Medium |
| 5.78 ± 0.12 | Weak |
| 5.68 ± 0.12 | Weak |
| 4.97 ± 0.10 | Weak |
| 4.58 ± 0.09 | Weak |
| 3.99 ± 0.08 | Strong |
| 3.94 ± 0.08 | Medium-Strong |
| 3.85 ± 0.08 | Medium |
| 3.78 ± 0.08 | Strong |
| 3.74 ± 0.08 | Weak |
| 3.66 ± 0.07 | Medium |
| 3.54 ± 0.07 | Very Strong |
| 3.48 ± 0.07 | Very Strong |
| 3.39 ± 0.07 | Weak |
| 3.32 ± 0.07 | Weak-Medium |
| 3.14 ± 0.06 | Weak-Medium |
| 2.90 ± 0.06 | Weak |
| 2.85 ± 0.06 | Weak |
| 2.71 ± 0.05 | Weak |
| 2.65 ± 0.05 | Weak |
| 2.62 ± 0.05 | Weak |
| 2.58 ± 0.05 | Weak |
| 2.54 ± 0.05 | Weak |
| 2.48 ± 0.05 | Weak |

The synthetic ZSM-38 zeolite possesses a definite distinguishing crystalline structure whose X-ray diffraction pattern shows substantially the significant lines set forth in Table 1A.

TABLE 1A

| Interplanar Spacing | Relative Intensity |
|---|---|
| 9.8 ± 0.20 | Strong |
| 9.1 ± 0.19 | Medium |
| 8.0 ± 0.16 | Weak |
| 7.1 ± 0.14 | Medium |
| 6.7 ± 0.14 | Medium |
| 6.0 ± 0.12 | Weak |
| 4.37 ± 0.09 | Weak |
| 4.23 ± 0.09 | Weak |
| 4.01 ± 0.08 | Very Strong |
| 3.81 ± 0.08 | Very Strong |
| 3.69 ± 0.07 | Medium |
| 3.57 ± 0.07 | Very Strong |
| 3.51 ± 0.07 | Very Strong |
| 3.34 ± 0.07 | Medium |
| 3.17 ± 0.06 | Strong |
| 3.08 ± 0.06 | Medium |
| 3.00 ± 0.06 | Weak |
| 2.92 ± 0.06 | Medium |
| 2.73 ± 0.06 | Weak |
| 2.66 ± 0.05 | Weak |
| 2.60 ± 0.05 | Weak |
| 2.49 ± 0.05 | Weak |

These values were determined by standard technique. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, $100 \, I/I_o$, where $I_o$ is the intensity of the strongest line or peak, and k (obs.), the interplanar spacing in Angstrom units, corresponding to the recorded lines, were calculated. It should be understood that these X-ray diffraction patterns are characteristic of all the species of the above respectively identified zeolites. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

Zeolites ZSM-5, ZSM-11 and ZSM-12 for use in the process of this invention are prepared as indicated in their respective patents, incorporated herein by reference above.

Zeolite ZSM-35 can be suitably prepared by preparing a solution containing sources of an alkali metal oxide, preferably sodium oxide, an organic nitrogen-containing oxide, an oxide of aluminum, an oxide of silicon and water and having a composition, in terms of mole ratios of oxides, falling within the following ranges:

TABLE 2

| | Broad | Preferred |
|---|---|---|
| $\dfrac{R^+}{R^+ + M^+}$ | 0.02–1.0 | 0.3–0.9 |
| $OH^-/SiO_2$ | 0.05–0.5 | 0.07–0.49 |
| $H_2O/OH^-$ | 41–500 | 250 |
| $SiO_2/Al_2O_3$ | 8.8–200 | 12–60 | wherein R is an organic nitrogen-containing cation derived from pyrrolidine or ethylenediamine and M is an alkali metal ion, and maintaining the mixture until crystals of the zeolite are formed. (The quantity of $OH^-$ is calculated only from the inorganic sources of alkali without any organic base contribution). Thereafter, the crystals are separated from the liquid and recovered. Typical reaction conditions consist of heating the foregoing reaction mixture to a temperature of from about 90° F. to about 400° F. for a period of time of from about 6 hours to about 100 days. A more preferred temperature range is from about 150° F. to about 400° F. with the amount of time at a temperature in such range being from about 6 hours to about 80 days.

The digestion of the gel particles is carried out until crystals form. The solid product is separated from the reaction medium, as by cooling the whole to room temperature, filtering and water washing. The crystalline product is dried, e.g. at 230° F., for from about 8 to 24 hours.

Zeolite ZSM-38 can be suitably prepared by preparing a solution containing sources of an alkali metal oxide, preferably sodium oxide, an organic nitrogen-containing oxide, an oxide of aluminum, an oxide of silicon and water and having a composition, in terms of mole ratios of oxides, falling within the following ranges:

TABLE 3

|  | Broad | Preferred |
|---|---|---|
| $\frac{R^+}{R^+ + M^+}$ | 0.2–1.0 | 0.3–0.9 |
| $OH^-/SiO_2$ | 0.05–0.5 | 0.07–0.49 |
| $H_2O/OH^-$ | 41–500 | 100–250 |
| $SiO_2/Al_2O_3$ | 8.8–200 | 12–60 | wherein R is an organic nitrogen-containing cation derived from a 2-(hydroxyalkyl) trialkylammonium compound and M is an alkali metal ion, and maintaining the mixture until crystals of the zeolite are formed. (The quantity of $OH^-$ is calculated only from the inorganic sources of alkali without any organic base contribution). Thereafter, the crystals are separated from the liquid and recovered. Typical reaction conditions consist of heating the foregoing reaction mixture to a temperature of from about 90° F. to about 400° F. for a period of time of from about 6 hours to about 100 days. A more preferred temperature range is from about 150° F. to about 400° F. with the amount of time at a temperature in such range being from about 6 hours to about 80 days.

The digestion of the gel particles is carried out until crystals form. The solid product is separated from the reaction medium, as by cooling the whole to room temperature, filtering and water washing. The crystalline product is thereafter dried, e.g. at 230° F. for from about 8 to 24 hours.

For the improved process of this invention the suitable zeolite catalyst is employed in combination with a support or binder material such as, for example, a porous inorganic oxide support or a clay binder. Non-limiting examples of such binder materials include alumina, zirconia, silica, magnesia, thoria, titania, boria and combinations thereof, generally in the form of dried inorganic oxide gels and gelatinous precipitates. Suitable clay materials include, by way of example, bentonite and kieselguhr. The relative proportion of suitable crystalline aluminosilicate zeolite of the total composition of catalyst and binder or support may vary widely with the zeolite content ranging from between about 30 to about 90 percent by weight and more usually in the range of about 50 to about 80 percent by weight of the composition.

Operating conditions employed in the process of the present invention are critical. Such conditions as temperature, pressure, space velocity, molar ratio of co-fed water to gas oil feedstock, absence or presence of added hydrogen, and the presence of any diluents will have important effects on the process.

The process of this invention is conducted in the liquid or mixed gas-liquid phase and with or without added hydrogen by contact in a reaction zone, such as, for example, a fixed bed of catalyst composition, under conversion effective conditions, said catalyst composition being characterized, as synthesized, as comprising one or more of the above-defined zeolite compositions. This process may be conducted in either batch or fluid bed operation with attendent benefits of either operation readily obtainable.

The present improved process may be carried out at a temperature of between about 450° F. and about 800° F., preferably from about 500° F. to about 750° F., and at pressures ranging from about 50 psig up to about 3000 psig, preferably from about 100 psig to about 1000 psig. The liquid hourly space velocity (LHSV) may be maintained at from about 0.1 $hr^{-1}$ to about 20 $hr^{-1}$, preferably from about 0.5 $hr^{-1}$ to about 2 $hr^{-1}$. Hydrogen circulation may be maintained at from 0 to about 10,000 scf/bbl. The preferred amount of co-fed water is from about 0.5 to about 5 moles of water/mole of gas oil feedstock. Within these limits the conditions of temperature and pressure will vary considerably depending upon equilibrium considerations and exact feed material. Optimum conditions are those in which maximum yields of desired dewaxed products are obtained and hence temperature and pressure will vary within a range of conversion levels designed to provide the highest selectivity and maximum yield.

The starting feed materials for the present improved process are petroleum stocks boiling above about 350° F. and containing straight chain and slightly branched chain hydrocarbons which are selectively converted utilizing a catalyst composition as hereinabove particularly described.

The improvement realized by way of the present process is substantial in that coking and aging rates of the catalyst are controlled while conversions remain favorable. The zeolite catalysts above defined for use herein are found to be hydrophobic and unique in their ability to utilize the large molar equivalents of co-fed water to resist coking and aging at the activity levels maintained in the present process.

The following specific examples will serve to illustrate the process of the present invention, without unduly limiting same.

EXAMPLE 1

A silicate solution containing 90.9 pounds Q-Brand sodium silicate (8.8 wt. % $Na_2O$, 28.5 wt. % $SiO_2$ and 62.7 wt. % $H_2O$), 52.6 pounds $H_2O$, and 118 grams Daxad 27 dispersant (sodium salt of polymerized substituted benzoid alkylsulfonic acid combined with an inert inorganic suspending agent) was mixed in a mixing nozzle with an acid solution containing 1430 grams $Al_2(SO_4)_3.14\ H_2O$, 3440 grams $H_2SO_4$, 4890 grams NaCl, and 54 pounds $H_2O$ to form a gel which was discharged into a 30 gallon autoclave to which 1180 grams of $H_2O$ has been previously added. The gel was whipped by agitation and 2840 grams of NaCl was added and thoroughly blended. The agitation was stopped and an organic solution containing 2780 grams tri-n-propylamine, 2390 grams n-propyl bromide, and methyl ethyl ketone was added as a layer on top of the gel. The autoclave was sealed and heated to about 220° F. without agitation and held there for 14–15 hours to prereact the organics. At the end of the prereaction period the agitation was commenced at 90 rpm to start the initial crystallization period. After about 75–80 hours, the temperature was raised to 320° F. and held there for about 3 hours to complete crystallization. The excess or unreacted organics were flashed off and the contents of the autoclave were cooled and discharged. Chemical analysis of the washed crystalline product was 2.21 wt. % $Al_2O_3$, 94.9 wt. % $SiO_2$, 0.81 wt. % Na, 0.67 wt. % N, and 8.2 wt. % carbon, and it was identified by X-ray as ZSM-5.

After drying at about 250° F., the zeolite was mixed with alpha-alumina monohydrate and H₂O (65% zeolite, 35% alumina binder on ignited basis), then extruded to form 1/16 inch pellets. The pellets were calcined in nitrogen atmosphere for 3 hours at 1000° F., ion exchanged with 1 normal NH₄Cl at room temperature for 1 hour using 5 milliliters solution per gram of dry zeolite, water-washed, and finally calcined in 100% air for 3 hours at 1000° F.

EXAMPLES 2-7

The catalyst material prepared in Example 1, sized to 30-60 mesh, was charged to a 5/16th-inch I.D. stainless steel tubing reactor with provision for water injection at the reactor inlet from a positive displacement pump. Six separate runs were conducted in this reactor, each with 5 or 10 cc of fresh catalyst, under varying conditions and for different times on stream. The feedstock to the reactor was a 650°-760° F. Arab Gas Oil having a pour point of 55° F. and a specific gravity of 0.8866. No hydrogen was added to the reactor for these runs. Reaction conditions and results are reported hereinafter in Table 4.

From the information generated by Examples 2-7, it is observed that aging rates were high at the reaction pressures used when water was not co-fed to the reactor. The beneficial affect of the large amounts of co-fed water on coke lay-down is clear by comparison of the examples run with and without water injection.

TABLE 4

| Example | 2 | 3 | 4 | 5 | 6 | 7 |
|---|---|---|---|---|---|---|
| Pressure, psig | 50 | 50 | 500 | 500 | 500 | 500 |
| Gas oil, LHSV | 1.0 | 1.0 | 1.0 | 1.0 | 1.1 | 1.1 |
| H₂O, LHSV | — | 0.06 | — | 0.06 | 0.10 | 0.83 |
| Mole ratio of H₂O/gas oil | — | 2.6 | — | 2.6 | 3.9 | 32.5 |
| Initial temperature, ° F.* | 610 | 590 | 540 | 550 | 540 | 530 |
| Final temperature, ° F.* | 820 | 830 | 770 | 760 | 620 | 610 |
| Time on stream, days | 5 | 7 | 8 | 22 | 10 | 14 |
| Aging rate, ° F./day | 41 | 34 | 29 | 10 | 8 | 6 |
| Coke on catalyst, wt. % | 22.0 | 15.7 | 11.5 | 17.3 | 9.6 | 7.5 |

*For 330° F.⁺ product, pour point of 0° F.

EXAMPLE 8

A portion of the dried ammonium ZSM-5 extrudate from Example 1 was ion exchanged with 1 normal Ni(NO₃)₂ at 190° F. for 4 hours using 5 cc of exchange solution per gram of dry extrudate, water-washed, dried, and finally calcined in 100% air for 3 hours at 1000° F. The final product was analyzed and found to contain less than 0.01% wt. % Na and 1.03 wt. % Ni.

EXAMPLE 9

A 3.3 cc portion of fresh catalyst material from Example 8, sized to 30-60 mesh, was charged to the reactor used for Examples 2-7 for a run with the same feedstock as used for Examples 2-7. The catalyst was sulfided in situ with a H₂S/H₂ mixture at 750° F. Hydrogen was added to the reactor for this run at 2500 scf/bbl, pressure was maintained at 500 psig, LHSV of the gas oil feedstock was 1.5 and the ratio of moles of co-fed water/mole of gas oil feedstock was 6.5±1.0. The catalyst was regenerated twice during the run as follows:

Regeneration #1

Hydrogen regeneration at 500 psig and 900° F. for 17 hours at a H₂ flow of about 19,000 scf/bbl.

Regeneration #2

Hydrogen regeneration at 500 psig and 625° F. for 2 hours and 900° F. for 18 hours at a H₂ flow of 2500 scf/bbl.

Results of the run proved that the use of co-fed water and hydrogen worked synergistically to prevent the catalyst from deactivating by coke formation and/or nitrogen compound deposition. Aging data for this example is summarized in Table 5.

TABLE 5

| Cycle | Fresh | After Regen. #1 | After Regen. #2 |
|---|---|---|---|
| Days on stream | 24 | 20 | 4 |
| Total days on stream | 24 | 44 | 48 |
| Initial temp., ° F.* | 540 | 580 | ~580 |
| Final temp., ° F.* | 660 | 640 | — |
| Aging rate, ° F./day | 5 | 3 | — |

*For 330° F.⁺ product, pour point of 0° F.

What is claimed is:

1. In a catalytic process for dewaxing petroleum oil feedstock boiling above about 350° F. and containing straight chain and slightly branched chain hydrocarbons, the improvement which comprises contacting said oil feedstock with a catalyst comprising a crystalline aluminosilicate zeolite, characterized by a silica/alumina mole ratio of at least 12 and a constraint index within the approximate range of 1 to 12, in the presence of from 0.5 to about 15 moles of water/mole of oil feedstock.

2. The process of claim 1 wherein said crystalline aluminosilicate zeolite is ZSM-5.

3. The process of claim 1 wherein said crystalline aluminosilicate zeolite is ZSM-11.

4. The process of claim 1 wherein said crystalline aluminosilicate zeolite is ZSM-12.

5. The process of claim 1 wherein said crystalline aluminosilicate zeolite ZSM-35.

6. The process of claim 1 wherein said crystalline aluminosilicate zeolite is ZSM-38.

7. The process of claim 1 wherein said process is conducted at a temperature of from about 450° F. to about 800° F., a pressure of from about 50 psig to about 3000 psig, a liquid hourly space velocity of from about 0.1 hr⁻¹ to about 20 hr⁻¹, a hydrogen circulation rate of from 0 to about 10,000 scf/bbl, and wherein said mole ratio of water/oil feedstock is from about 0.5 to about 5.

8. The process of claim 2 wherein said process is conducted at a temperature of from about 450° F. to about 800° F., a pressure of from about 50 psig to about 3000 psig, a liquid hourly space velocity of from about 0.1 hr$^{-1}$ to about 20 hr$^{-1}$, a hydrogen circulation rate of from 0 to about 10,000 scf/bbl, and wherein said mole ratio of water/oil feedstock is from about 0.5 to about 5.

9. The process of claim 3 wherein said process is conducted at a temperature of from about 450° F. to about 800° F., a pressure of from about 50 psig to about 3000 psig, a liquid hourly space velocity of from about 0.1 hr$^{-1}$ to about 20 hr$^{-1}$, a hydrogen circulation rate of from 0 to about 10,000 scf/bbl, and wherein said mole ratio of water/oil feedstock is from about 0.5 to about 5.

10. The process of claim 4 wherein said process is conducted at a temperature of from about 450° F. to about 800° F., a pressure of from about 50 psig to about 3000 psig, a liquid hourly space velocity of from about 0.1 hr$^{-1}$ to about 20 hr$^{-1}$, a hydrogen circulation rate of from 0 to about 10,000 scf/bbl, and wherein said mole ratio of water/oil feedstock is from about 0.5 to about 5.

11. The process of claim 5 wherein said process is conducted at a temperature of from about 450° F. to about 800° F., a pressure of from about 50 psig to about 3000 psig, a liquid hourly space velocity of from about 0.1 hr$^{-1}$ to about 20 hr$^{-1}$, a hydrogen circulation rate of from 0 to about 10,000 scf/bbl, and wherein said mole ratio of water/oil feedstock is from about 0.5 to about 5.

12. The process of claim 6 wherein said process is conducted at a temperature of from about 450° F. to about 800° F., a pressure of from about 50 psig to about 3000 psig, a liquid hourly space velocity of from about 0.1 hr$^{-1}$ to about 20 hr$^{-1}$, a hydrogen circulation rate of from 0 to about 10,000 scf/bbl, and wherein said mole ratio of water/oil feedstock is from about 0.5 to about 5.

13. The process of claim 1 wherein said oil feedstock has a nitrogen content of from about 0.01 to about 3 weight percent.

14. The process of claim 2 wherein said oil feedstock has a nitrogen content of from about 0.01 to about 3 weight percent.

15. The process of claim 3 wherein said oil feedstock has a nitrogen content of from about 0.01 to about 3 weight percent.

16. The process of claim 4 wherein said oil feedstock has a nitrogen content of from about 0.01 to about 3 weight percent.

17. The process of claim 5 wherein said oil feedstock has a nitrogen content of from about 0.01 to about 3 weight percent.

18. The process of claim 6 wherein said oil feedstock has a nitrogen content of from about 0.01 to about 3 weight percent.

19. The process of claim 7 wherein said oil feedstock has a nitrogen content of from about 0.01 to about 3 weight percent.

20. The process of claim 8 wherein said oil feedstock has a nitrogen content of from about 0.01 to about 3 weight percent.

21. The process of claim 9 wherein said oil feedstock has a nitrogen content of from about 0.01 to about 3 weight percent.

22. The process of claim 10 wherein said oil feedstock has a nitrogen content of from about 0.01 to about 3 weight percent.

23. The process of claim 11 wherein said oil feedstock has a nitrogen content of from about 0.01 to about 3 weight percent.

24. The process of claim 12 wherein said oil feedstock has a nitrogen content of from about 0.01 to about 3 weight percent.

* * * * *

UNITED STATES PATENT AND TRADEMARK OFFICE
CERTIFICATE OF CORRECTION

PATENT NO. : 4,149,960
DATED : April 17, 1979
INVENTOR(S) : William E. Garwood, Philip D. Caesar and James A. Brennan It is certified that error appears in the above-identified patent and that said Letters Patent are hereby corrected as shown below:

Column 7, lines 24-28 change: "In- Relative Intensity
(Table 1) ter-
pla-
nar
Spacing" to -- Interplanar Spacing -- -- Relative Intensity Column 8, line 48 change: "250" under column headed Preferred to
(Table 2) -- 100-250 --.

Signed and Sealed this

Eleventh Day of September 1979

[SEAL]

Attest:

LUTRELLE F. PARKER
*Attesting Officer* *Acting Commissioner of Patents and Trademarks*

UNITED STATES PATENT AND TRADEMARK OFFICE
CERTIFICATE OF CORRECTION

PATENT NO. : 4,149,960
DATED : April 17, 1979
INVENTOR(S) : William E. Garwood et al.

It is certified that error appears in the above-identified patent and that said Letters Patent are hereby corrected as shown below:

The term of this patent subsequent to March 9, 1995 has been disclaimed.

Signed and Sealed this

Thirtieth Day of October 1979

[SEAL]

Attest:

RUTH C. MASON
Attesting Officer

LUTRELLE F. PARKER
Acting Commissioner of Patents and Trademarks